United States Patent
Mueller

(10) Patent No.: US 10,756,505 B2
(45) Date of Patent: Aug. 25, 2020

(54) TUNABLE LIGHT SOURCE WITH BROADBAND OUTPUT

(71) Applicant: Qioptiq Photonics GmbH & Co. KG, Goettingen (DE)

(72) Inventor: Frank Mueller, Munich (DE)

(73) Assignee: Qioptiq Photonics GmbH & Co. KG, Goettingen (DE)

( * ) Notice: Subject to any disclaimer, the term of this patent is extended or adjusted under 35 U.S.C. 154(b) by 0 days.

(21) Appl. No.: 15/809,624

(22) Filed: Nov. 10, 2017

(65) Prior Publication Data

US 2019/0089121 A1 Mar. 21, 2019

Related U.S. Application Data

(60) Provisional application No. 62/561,413, filed on Sep. 21, 2017.

(51) Int. Cl.
| | |
|---|---|
| H01S 3/108 | (2006.01) |
| H01S 3/0941 | (2006.01) |
| H01S 3/23 | (2006.01) |
| H01S 3/06 | (2006.01) |
| H01S 3/00 | (2006.01) |
| G02F 1/39 | (2006.01) |
| H01S 3/10 | (2006.01) |

(52) U.S. Cl.
CPC .............. *H01S 3/1083* (2013.01); *G02F 1/39* (2013.01); *H01S 3/0092* (2013.01); *H01S 3/0602* (2013.01); *H01S 3/0941* (2013.01); *H01S 3/2308* (2013.01); *H01S 3/10023* (2013.01)

(58) Field of Classification Search
CPC .... H01S 3/1083; H01S 3/0092; H01S 3/0602; H01S 3/2308; H01S 3/0941; H01S 3/10023
See application file for complete search history.

(56) References Cited

U.S. PATENT DOCUMENTS

| | | |
|---|---|---|
| 5,144,629 A | 9/1992 | Basu |
| 5,663,973 A | 9/1997 | Stamm et al. |
| 5,796,513 A | 8/1998 | Stamm et al. |
| 5,894,489 A | 4/1999 | Halldorsson et al. |
| 5,999,547 A | 12/1999 | Schneider et al. |

(Continued)

FOREIGN PATENT DOCUMENTS

| | | |
|---|---|---|
| AT | 524763 | 9/2001 |
| AT | 369641 | 8/2007 |

(Continued)

OTHER PUBLICATIONS

Lin, et al; Fiber-laser-pumped CW OPO for Red, Green, Blue Laser Generation; 2010 /vol. 18, No. 3 / Optics Express 2361 published Jan. 21, 2010.

(Continued)

*Primary Examiner* — Yuanda Zhang
(74) *Attorney, Agent, or Firm* — Peter A. Nieves; Sheehan Phinney Bass & Green PA

(57) ABSTRACT

A light source providing tunable light of macroscopic power, particularly by utilizing a broadband pump source, an optical parametric oscillator (OPO) and at least one additional nonlinear process. The light source is capable of producing a tunable broadband emission of macroscopic power, particularly at wavelengths less than 1.1 μm.

15 Claims, 6 Drawing Sheets

(56) References Cited

U.S. PATENT DOCUMENTS

| | | | |
|---|---|---|---|
| 6,088,379 A | 7/2000 | Owa et al. | |
| 6,108,356 A | 8/2000 | Yin et al. | |
| 6,249,371 B1 | 6/2001 | Masuda et al. | |
| 6,683,894 B1 | 1/2004 | Lee et al. | |
| 6,731,660 B2 | 5/2004 | Arbore et al. | |
| 6,757,096 B2 | 6/2004 | Schiller | |
| 6,798,502 B2 | 9/2004 | Hunt | |
| 6,856,737 B1 | 2/2005 | Parker et al. | |
| 6,870,664 B2 | 3/2005 | Jovanovic et al. | |
| 6,898,218 B2 | 5/2005 | McCarthy | |
| 7,054,339 B1* | 5/2006 | Hu | G02F 1/3534 372/12 |
| 7,106,764 B1 | 9/2006 | Weingarten et al. | |
| 7,136,402 B1 | 11/2006 | Ohtsuki | |
| 7,151,787 B2 | 12/2006 | Kulp et al. | |
| 7,248,397 B1 | 7/2007 | Armstrong | |
| 7,280,268 B2 | 10/2007 | Lucht et al. | |
| 7,599,408 B2 | 10/2009 | Vachss | |
| 7,706,054 B2 | 4/2010 | Rae et al. | |
| 7,801,188 B2 | 9/2010 | Karlsson et al. | |
| 8,120,778 B2 | 2/2012 | Fermann et al. | |
| 8,237,122 B2 | 8/2012 | Fermann et al. | |
| 8,369,003 B2 | 2/2013 | Lin et al. | |
| 8,384,990 B2 | 2/2013 | Vodopyanov et al. | |
| 8,699,532 B2 | 4/2014 | Fermann et al. | |
| 8,774,236 B2 | 7/2014 | Ter-Mikirtychev | |
| 8,780,946 B2 | 7/2014 | Tokuhisa | |
| 8,817,827 B2 | 8/2014 | Ter-Mikirtychev | |
| 8,830,565 B2 | 9/2014 | Dun et al. | |
| 8,837,550 B2 | 9/2014 | Shapira et al. | |
| 8,929,406 B2 | 1/2015 | Chuang et al. | |
| 9,057,927 B2 | 6/2015 | Hu | |
| 9,099,837 B2 | 8/2015 | Miesak et al. | |
| 9,252,560 B2 | 2/2016 | Fermann et al. | |
| 9,318,869 B2 | 4/2016 | Chuang et al. | |
| 9,529,182 B2 | 12/2016 | Chuang et al. | |
| 9,653,880 B2 | 5/2017 | Mueller | |
| 9,698,559 B2 | 7/2017 | Fermann et al. | |
| 9,748,729 B2 | 8/2017 | Chuang et al. | |
| 9,804,101 B2 | 10/2017 | Deng et al. | |
| 2005/0047702 A1 | 3/2005 | Parker et al. | |
| 2006/0045145 A1 | 3/2006 | Arahira et al. | |
| 2007/0025662 A1 | 2/2007 | Gugel | |
| 2007/0035810 A1* | 2/2007 | Henderson | H01S 3/0675 359/330 |
| 2007/0110442 A1* | 5/2007 | Peer | H04J 14/005 398/78 |
| 2009/0028193 A1* | 1/2009 | Islam | H01S 5/0064 372/6 |
| 2011/0058248 A1* | 3/2011 | Vodopyanov | G02F 1/39 359/330 |
| 2012/0081694 A1 | 4/2012 | Fermann et al. | |
| 2012/0195333 A1* | 8/2012 | Huang | H01S 3/0092 372/22 |
| 2014/0050234 A1* | 2/2014 | Ter-Mikirtychev | H01S 3/10007 372/6 |
| 2014/0071406 A1* | 3/2014 | Manni | G02B 27/48 353/31 |
| 2017/0063026 A1 | 3/2017 | Chuang et al. | |
| 2018/0024414 A1 | 1/2018 | Mueller | |
| 2018/0224711 A1* | 8/2018 | Chuang | G01N 21/3563 |

FOREIGN PATENT DOCUMENTS

| | | |
|---|---|---|
| AT | 427518 | 4/2009 |
| CA | 2616667 | 2/2006 |
| CA | 2731163 | 2/2010 |
| DE | 19624865 | 3/1997 |
| DE | 19619483 | 11/1997 |
| DE | 69802122 | 3/2002 |
| DE | 10152507 | 10/2002 |
| DE | 60035821 | 1/2008 |
| DE | 60326960 | 5/2009 |
| DE | 112015004544 | 8/2017 |
| EP | 857997 | 8/1998 |
| EP | 1037338 | 8/2003 |
| EP | 2659554 | 11/2003 |
| EP | 1517173 | 3/2005 |
| EP | 1530744 | 1/2009 |
| EP | 2309325 | 4/2011 |
| EP | 1771765 | 9/2011 |
| EP | 2662940 | 11/2013 |
| EP | 2949015 | 12/2015 |
| EP | 3096183 | 11/2016 |
| GB | 0416673 | 8/2004 |
| GB | 0813980 | 9/2008 |
| GB | 2449968 | 10/2008 |
| GB | 0809788 | 10/2009 |
| JP | H10341054 | 12/1998 |
| JP | 2000261081 | 9/2000 |
| JP | 2002099011 | 4/2002 |
| JP | 3514073 | 3/2004 |
| JP | 2006066586 | 3/2006 |
| JP | 4147365 | 9/2008 |
| JP | 2014504746 | 2/2014 |
| JP | 2016508620 | 3/2016 |
| JP | 2016508627 | 3/2016 |
| JP | 5933591 | 5/2016 |
| JP | 6050684 | 12/2016 |
| JP | 2016206390 | 12/2016 |
| JP | 2017509923 | 4/2017 |
| KR | 20130119416 | 10/2013 |
| KR | 20140039145 | 4/2014 |
| KR | 20150109472 | 10/2015 |
| KR | 20150119040 | 10/2015 |
| KR | 20160135790 | 11/2016 |
| KR | 20170066554 | 6/2017 |
| TW | 201111890 | 4/2011 |
| TW | 201208220 | 2/2012 |
| TW | I408481 | 9/2013 |
| TW | 201444209 | 11/2014 |
| TW | 201448384 | 12/2014 |
| TW | 201539905 | 10/2015 |
| TW | 201614916 | 4/2016 |
| WO | 2001020397 | 3/2001 |
| WO | 2004000163 | 12/2003 |
| WO | 2006010916 | 2/2006 |
| WO | 2010013003 | 2/2010 |
| WO | 2011158927 | 12/2011 |
| WO | 2012092362 | 7/2012 |
| WO | 2012126495 | 9/2012 |
| WO | WO2011158927 | 8/2013 |
| WO | 2014028353 | 2/2014 |
| WO | 2014074136 | 5/2014 |
| WO | 2014116922 | 7/2014 |
| WO | 2014127100 | 8/2014 |
| WO | 2015143152 | 9/2015 |
| WO | 2016054589 | 4/2016 |
| WO | 3096182 | 11/2016 |
| WO | 3096183 | 11/2016 |
| WO | 2017042439 | 3/2017 |

OTHER PUBLICATIONS

D. Chen and T. S. Rose, "Low Noise 10-W CW OPO Generation near 3μm with MgO Doped PPLN," in Conference on Lasers and Electro-Optics/Quantum Electronics and Laser Science and Photonic Applications Systems Technologies, Technical Digest (CD) (Optical Society of America, 2005), paper CThQ2.

C. R. Phillips and M. M. Fejer, "Stability of the singly resonant optical parametric oscillator," J. Opt. Soc. Am. 8, vol. 27, No. 12, pp. 2687-2699 (Dec. 2010).

A. S. Villar et al., "Entanglement in the above-threshold optical parametric oscillator," J. Opt. Soc. AM. 8, vol. 24, No. 2, pp. 249-256 (Feb. 2007).

Westphal v. et al; "Laser Diode Stimulated Emissions Depletion Microscopy" Applied Physics Letters, AIP Publishing, LLC vol. 82, No. 18, May 5, 2003.

International Search Report for PCT/US2018/051405, dated Dec. 20, 2018.

(56) References Cited

OTHER PUBLICATIONS

International Search Report for PCT/US2018/051401, dated Dec. 17, 2018.

* cited by examiner

TUNABLE LIGHT SOURCE WITH BROADBAND OUTPUT

CROSS-REFERENCE TO RELATED APPLICATIONS

This application claims the benefit of U.S. Patent Application Ser. No. 62/561,413, filed Sep. 21, 2017, entitled "TUNABLE LIGHT SOURCE WITH BROADBAND OUTPUT," which is incorporated by reference herein in its entirety.

FIELD OF THE INVENTION

The present invention generally relates to a light source providing tunable light of macroscopic power, and more particularly, is related to a light source which utilizes a broadband pump source, an optical parametric oscillator (OPO) and at least one additional nonlinear process for producing a tunable broadband emission of macroscopic power, especially at wavelengths less than 1.1 µm.

BACKGROUND

An optical parametric oscillator (OPO) is a light source emitting radiation with properties comparable to that of a laser. OPOs are nonlinear devices that split short wavelength pump photons into two longer wavelength photons, namely signal and idler photons. The wavelengths of the signal and idler photons are not independent from each other, but may be tuned in wavelength.

As shown by FIG. 1, an OPO converts an input laser wave (the "pump") with frequency $\omega_p$ into two output waves of lower frequency ($\omega_s$, $\omega_i$) via second-order nonlinear optical interaction. The sum of the frequencies of the output waves is equal to the input wave frequency: $\omega_s + \omega_i = \omega_p$. For historic reasons, the output wave with the higher frequency $\omega_s$ is called the signal, and the output wave with the lower frequency $\omega_i$ is called the idler. Because the OPO does not convert all the input energy into the signal and idler, a residual pump wave is also output.

OPOs need an optical resonator, but in contrast to lasers, OPOs are based on direct frequency conversion in a non-linear crystal rather than from stimulated emission. OPOs exhibit a power threshold for an input light source (pump), below which there is negligible output power in the signal and idler bands.

OPOs include an optical resonator (cavity) and a non-linear optical crystal. The optical cavity is an arrangement of mirrors that forms a resonator for light waves. Light confined in the cavity is reflected multiple times resulting in a multi-pass through the nonlinear crystal. The optical cavity serves to resonate at least one of the signal and idler waves. In the nonlinear optical crystal, the pump, signal and idler beams overlap.

While conventional lasers produce limited fixed wavelengths, OPOs may be desirable because the signal and idler wavelengths, which are determined by the conservation of energy and momentum (via phase matching), can be varied in wide ranges. Thus, it is possible to access wavelengths, for example in the mid-infrared, far-infrared or terahertz spectral region, which may be difficult to obtain from a laser. In addition, OPOs allow for wide wavelength tunability, for example, by changing the phase-matching condition. This makes OPOs a useful tool, for example, for laser spectroscopy. Utilizing additional nonlinear processes can further extend the range of accessible wavelengths (e.g. near-infrared, visible and/or ultraviolet spectral regions).

In addition, while prior light sources such as spectrally filtered plasma sources and supercontinuum white light lasers are available, these light sources suffer from poor photon (energy) efficiency (typically a few mW output power per nm). On the other hand, OPO/non-linear optics (NLO) technology may offer significantly higher energy efficiency with more narrow band output powers of greater than 10 mW. Thus, while supercontinuum and plasma sources produce a broad spectrum from which (for many applications requiring narrower bandwidth) parts are cut off, OPOs are capable of producing a tunable comparatively narrow band output (so there is no waste of power by filtering out). Therefore, there is a need in the industry to address one or more of the above mentioned shortcomings.

SUMMARY OF THE INVENTION

Embodiments of the present invention provide a continuous wave (cw) light source based on OPO technology, plus further NLO processes. In particular, while typical cw OPO devices are used to generate high-power wavelength-tunable near-to mid-infrared (NIR to MIR) radiation of long coherence lengths, the present invention is capable of providing high power tunable wavelength emissions of short coherence length in the short NIR, VIS (visible) or even down to the UV (ultraviolet) region. In particular, the OPO module utilizes a broadband pump source and is configured to generate two waves: a resonant OPO wave that may have long-coherence length and a non-resonant wave of short coherence length widely adapting the bandwidth of the pump source. At least one more intracavity nonlinear processes (e.g. sum frequency generation (SFG) or OPO) produces at least one more output-beam having a shorter wavelength than the pump-source and being broadband. If desired, the light source of the invention may utilize an optional second high power broadband pump source.

The present light systems provide an emission spectrum that combines wavelength agility and high power, which will find use in a variety of applications including microscopy and the biotech industry.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principals of the invention. The components in the drawings are not necessarily to scale, emphasis instead being placed upon clearly illustrating the principles of the present invention. In the drawings, each like component is referenced by a like numeral. For purposes of clarity, every component may not be labeled in every drawing. In the drawings.

DETAILED DESCRIPTION OF THE INVENTION

Figure 1:
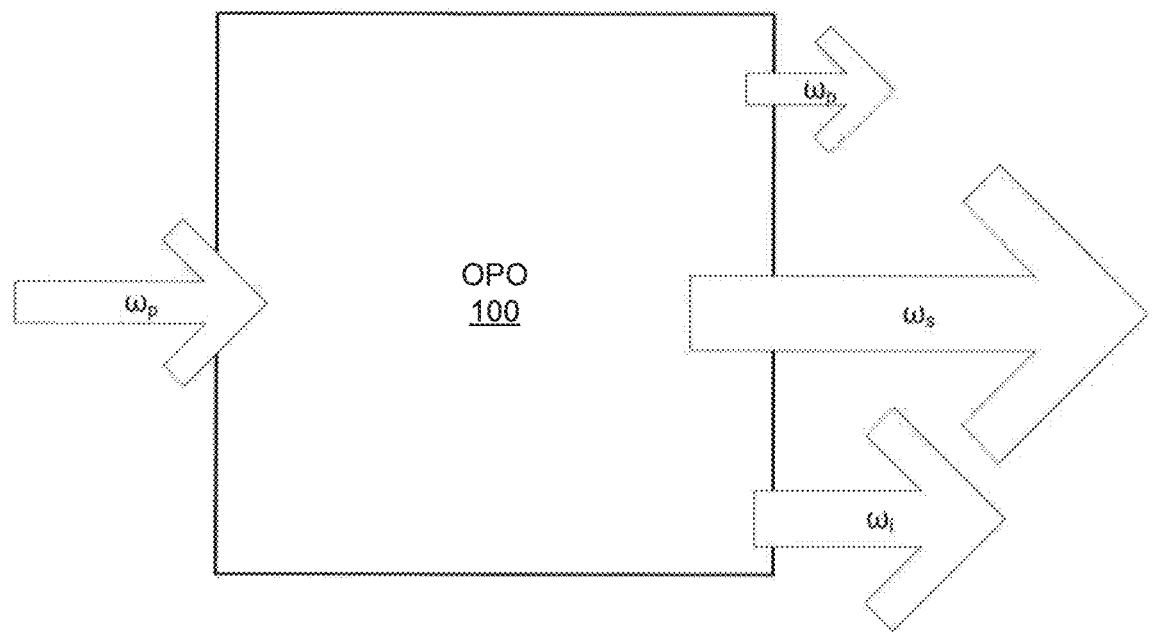
FIG. 1 is a general schematic diagram of a prior art OPO.

The following definitions are useful for interpreting terms applied to features of the embodiments disclosed herein, and are meant only to define elements within the disclosure. No limitations on terms used within the claims are intended, or should be derived, thereby. Terms used within the appended claims should only be limited by their customary meaning within the applicable arts.

Normally a light-source having more than 1 longitudinal mode is called "multi-longitudinal mode". However, as used within this disclosure, "multi-longitudinal mode" refers to a number of longitudinal modes greater than 3. A number of modes of 2 or 3 may be called "few single-modes" in this context.

As used within this disclosure, "broadband" refers to a bandwidth greater than 300 GHz, no matter if formed by multiple longitudinal modes, single broadened line(s) or an arbitrary spectral distribution, and no matter if before or after longitudinal mode scrambling. In this context broadband, broad linewidth, broad bandwidth and broad spectral width describes the same phenomena.

As used within this disclosure, "longitudinal mode scrambling" refers to a method for fast frequency-tuning of modes, continuously or via hopping. In this context, reference to "fast" frequency tuning of modes means faster than can be timely resolved for an application. One example of a fast frequency tuning of modes is a repetition rate of greater than 100 Hz (however, this is merely an example, and it is to be understood that reference to fast frequency tuning of modes in the present invention is not limited only to values of greater than 100 Hz).

As used within this disclosure, OPO generally refers to a continuous wave OPO (cw-OPO), rather than a pulsed OPO. In general, "continuous wave" or "CW" refers to a laser that produces a continuous output beam, sometimes referred to as "free-running," as opposed to a q-switched, gain-switched or mode locked laser, which has a pulsed output beam.

As used within this disclosure, shorter NIR refers to NIR wavelengths less than 1.1 μm.

As used within this disclosure, "mirror" refers to an optical element having at least one reflective surface. The reflective surface may reflect light received from one direction, but transmit light received from other directions. The reflective surface may reflect some wavelengths and transmit other wavelengths. Further the reflective surface may partially transmit and partially reflect some wavelengths.

As used within this disclosure, "macroscopic power" refers to power levels greater than 10 mW. Of course, it is to be understood that power levels greater than 100 mW or greater than 1 W are also considered macroscopic.

As used within this disclosure, an emission produced by at least one pump source and OPO module that "widely adapts the bandwidth" of the at least one pump source refers to any of the following, and is dependent upon the resonant OPO wave relative to the pump source: (1) in the case where the resonant OPO wave is much narrower than the pump source (which is most typical) and the pump-acceptance-bandwidth of the NLO-crystals is broader than the pump-bandwidth, then at least one emission has approximately the same bandwidth (measured in units of GHz) as the pump source, (2) in the case where the resonant OPO-wave is also broadband and the pump-acceptance-bandwidth of the NLO-crystals is broader than the pump-bandwidth, then at least one emission has even larger bandwidth (measured in units of GHz) than the pump source, and (3) in the case where the resonant OPO-wave is much narrower than the pump source and the pump-acceptance-bandwidth of the NLO-crystals is narrower than the pump-bandwidth, then the acceptance bandwidths of either or both NLO-crystals will set an upper limit to the emission bandwidths.

Reference will now be made in detail to embodiments of the present invention, examples of which are illustrated in the accompanying drawings. Wherever possible, the same reference numbers are used in the drawings and the description to refer to the same or like parts.

In general, embodiments of the present invention include devices and methods for producing tunable light of macroscopic power with a short coherence length (preferably less than 0.5 mm) in the shorter NIR, VIS and or UV. In particular, the embodiments produce such light by using a broadband pump source together with OPO technology in combination with additional nonlinear processes. This is in contrast with prior OPOs, in which typical cw OPO devices are used to generate macroscopic-power wavelength-tunable near-to mid-infrared (NIR to MIR) radiation of long coherence lengths. In some embodiments, the present invention may achieve the desired emission by pumping the OPO module using a broadband pump (for example, a broadband pump in total being greater than 300 GHz broad). The light source of the invention may optionally utilize a second OPO pump source having a wavelength differing from that of the first pump source.

According to an embodiment of the invention, the OPO module is pumped above the OPO-oscillation threshold. For example, the OPO module may be pumped up to about 2.5 times the OPO-oscillation threshold. Such pump power will likely result in a single-longitudinal mode resonant OPO wave. According other embodiments, the OPO may be pumped in excess of 2.5 times the OPO-oscillation threshold, for example, in excess of about 3 times the OPO-oscillation threshold, in excess of about 3.5 times, in excess of about 4 times, in excess of about 4.5 times, and even in excess of about 5 times the OPO-oscillation threshold. In embodiments utilizing a high power pump source which delivers a pump-power above about 2.5 times OPO-oscillation threshold, multi-longitudinal mode operation of the resonant OPO wave is likely achieved. As a non-limiting example, assuming an exemplary OPO oscillation threshold of approximately 2 W, then a high-power pump source delivering between 2 and 5 Watt may keep the resonant wave being single-longitudinal mode, whereas for high-power pump levels greater than 5 Watts the resonant-wave may start being multi-longitudinal-mode and/or broadened.

Figure 2:
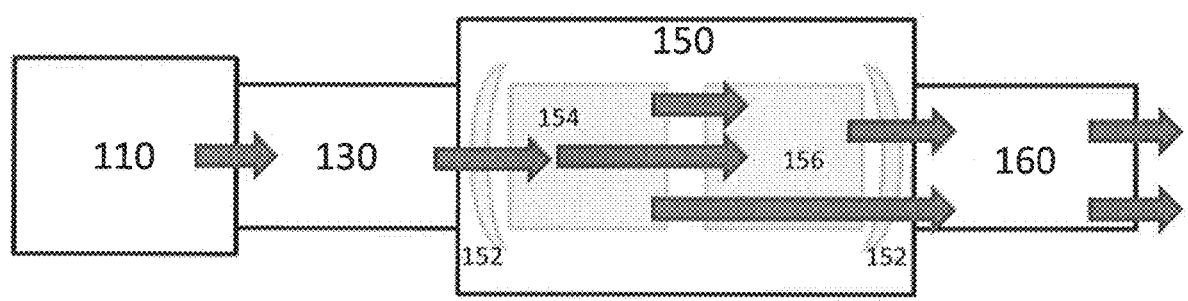
FIG. 2 is a schematic diagram of an OPO module pumped by a high power pump source according to a first embodiment of the present invention.

Referring now to the various figures of the drawing wherein like reference characters refer to like parts, there is shown in FIG. 2 one embodiment of the light source in accordance with the present invention. As shown, a high power pump source 110 pumps the OPO module 150 with a power level above the OPO oscillation threshold, which in turn produces an emission spectrum. According to various embodiments, the high power pump source 110 may be in the form of a common high-power laser or diode, or an amplified diode or laser. According to an exemplary embodiment, the high power pump source 110 is a broadband source (e.g. in total being greater than 300 GHz broad).

As depicted in FIG. 2, the OPO module 150 includes an optical resonator 152 resonant at least for one of the waves generated inside an NLO-crystal 154 (which may be configured for OPO-process) and at least one NLO-crystal 156 (which may be configured for SFG- or OPO-process). Both the NLO-crystals 154, 156 are provided with sufficient pump-acceptance bandwidth, in particular by utilizing sufficiently short NLO-crystals plus optionally a special shaped Gain-curve (for example, by using a ferroelectrically poled OPO crystal with multi-grating or chirped-grating along the beam path). This may enable control of a detailed shape of the emission spectrum. For example, in a crystal with chirped poling, the poling period may slightly vary along the beam-propagation resulting in a broadened gain curve and pump acceptance bandwidth for an OPO. Using a crystal with multi-grating along the beam path produces a superpositioning of gain-curves related to the different poling sections. For example, one crystal may contain several parallel chirped or multi-grating areas for wider wavelength-tuning. In some embodiments, a chirped-fanout grating may be used, having a gradual variation of poling period length along and perpendicular to the beam propagation direction.

According to one embodiment, the light source of the present invention is configured such that the emission spectrum of the OPO module 150 may be spectrally in a single-longitudinal mode in one part (for example, if the resonant wave is single-longitudinal mode), while other parts of the OPO module 150 emission spectrum widely adapt the bandwidth of the high power pump source 110. The latter refers to the non-resonant OPO wave and nonlinear processes involving the pump-wave. In addition, intracavity nonlinear processes involving the resonant OPO-wave are very efficient, because of the high power of the resonant OPO-wave. For example, for some OPOs the power-level of a resonant OPO wave may exceed 10 W, 100 W or even 1000 W. Nonlinear processes involving a broadband pump source enable broadband output generation. In particular, by incorporating additional nonlinear processes, the range of accessible wavelengths (e.g. near-infrared, visible and/or ultraviolet spectral regions) can be extended. Therefore, intracavity SFG of the pump and the resonant OPO-wave is one preferred process. The output of this process may again be used for SFG with the resonant OPO-wave.

According to another embodiment, the light source is configured such that the emission spectrum of the OPO module 150 is all multi-longitudinal mode. For example, where the resonant wave is multi-longitudinal mode (for example, pump power much greater than 2.5 times the OPO-threshold), then the OPO module 150 may be configured to provide an emission spectrum where all output waves are multi-longitudinal mode.

As further shown, an optional first spectral filter 130 may be disposed between the high power pump source 110 and the OPO module 150, to filter parts of the spectrum from the high power pump source 110 and/or to change the spectral width of the high power pump source 110 output.

The OPO module 150 then outputs the light to an optional second spectral filter 160 disposed at an output side of the OPO module 150. The second spectral filter 160 may be used to filter parts of the OPO-output spectrum or change the spectral widths of the OPO-output. The light source thus provides macroscopic power tunable wavelength and tunable bandwidth emissions of short coherence.

Figure 3:
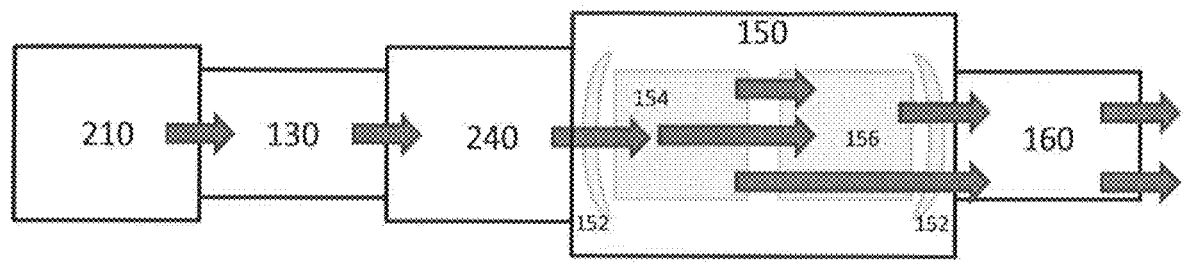
FIG. 3 is a schematic diagram of an OPO module pumped by a high-power pump source formed by a low-power light-source and an optical amplifier according to a second embodiment of the present invention.

FIG. 3 depicts another embodiment of the light source in accordance with the present invention. This embodiment is similar to that set out in FIG. 2, but adds a broadband optical amplifier 240 which is disposed between light source 210 (or the optional first spectral filter 130) and the OPO module 150 and amplifies the low power output of a light source 210 (which may be, for example, a laser, diode, lamp or supercontinuum source having, for example, a power-level below 100 mW or below 10 mW or even much lower) to a power level sufficient to overcome the OPO-threshold. The high-power output of the amplifier pumps the OPO module 150, which in turn produces a macroscopic power tunable wavelength broadband emission spectrum.

Similar to the embodiment described in connection with FIG. 2, the OPO module 150 of FIG. 3 includes an optical resonator 152 resonant at least for one of the waves generated inside the NLO-crystals 154, 156. The crystals 154, 156 are provided with sufficiently large phase-matching bandwidth. The OPO module 150 then outputs the light to an optional second spectral filter 160 which may be used to filter parts of the OPO-/SFG-output spectrum or change the spectral widths of the OPO-/SFG-outputs.

Figure 4:
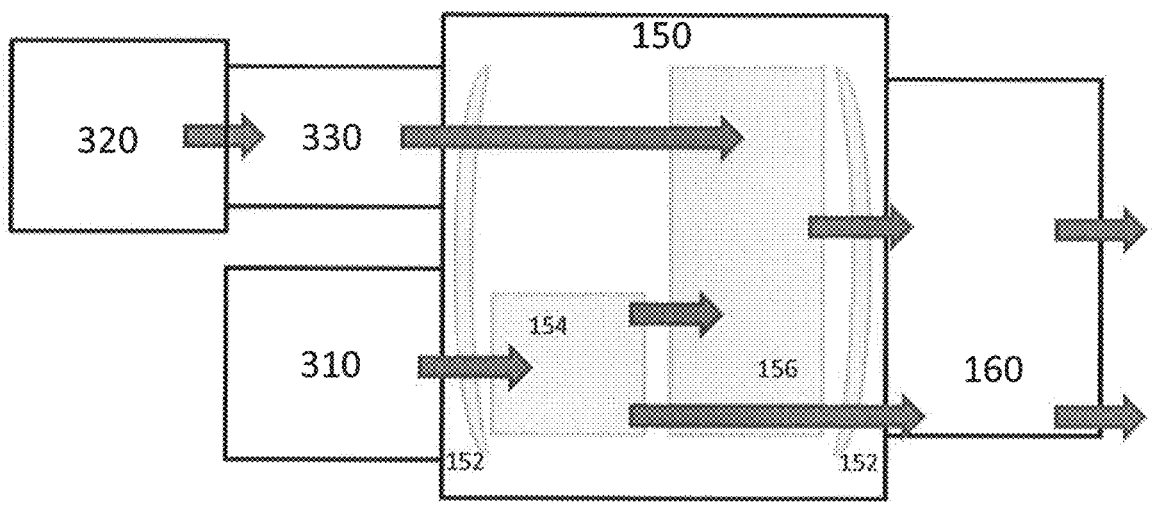
FIG. 4 is a schematic diagram of an OPO module pumped by a high power pump source and a second light source according to a third embodiment of the present invention.

FIG. 4 depicts another embodiment of the light source in accordance with the present invention. This embodiment is similar to that set out in FIG. 2, with an additional light source 320. As discussed in connection with FIG. 2, a high power pump source 310 (e.g., a common high-power near infrared (NIR) laser or an amplified diode or laser) pumps the OPO module 150, which in turn produces a macroscopic power tunable wavelength broadband emission spectrum.

As depicted in FIG. 4, the OPO module 150 includes an optical resonator 152 resonant for at least one of the waves generated inside an NLO-crystal 154 (which may be configured for one OPO-process) and at least one NLO-crystal 156 (which may be configured for SFG- or another OPO process). Both the NLO-crystals 154, 156 are provided with sufficient broad phase-matching bandwidth, in particular by utilizing sufficiently short NLO-crystals.

In the embodiment depicted in FIG. 4, the high power pump source 310 provides an emission directly to the OPO module 150 without an intermediate spectral filter. However, it is to be understood that a spectral filter (not shown) may be disposed between the high power pump source 310 and the OPO module 150 if desired so as to filter parts of the spectrum from the high power pump source 310 or to change the spectral width of the high power pump source 310 output. As shown in FIG. 4, an optional spectral filter 330 may be disposed between the additional light source 320 and the OPO module 150 so as to filter parts of the spectrum from the additional light source 320 or to change the spectral width of the additional light source 320 output.

As further depicted in FIG. 4, the additional light source 320 emission may pass only through the NLO-crystal 156. As such, the additional light source 320 may be one used in SFG generation. The OPO module 150 then outputs the light to an optional spectral filter 160 which may be used to filter parts of the OPO-/SFG-output spectrum or change the spectral widths of the OPO-/SFG-output.

According to various embodiments, the OPO module may comprise two OPO processes. This is described in co-pending U.S. patent application Ser. No. 15/646,434 (the disclosure of this application being hereby incorporated by reference in its entirety). By providing two OPO processes in the OPO module, broadband non-resonant OPO-waves emissions may be provided when a broadband pump-source is used.

Figure 5:
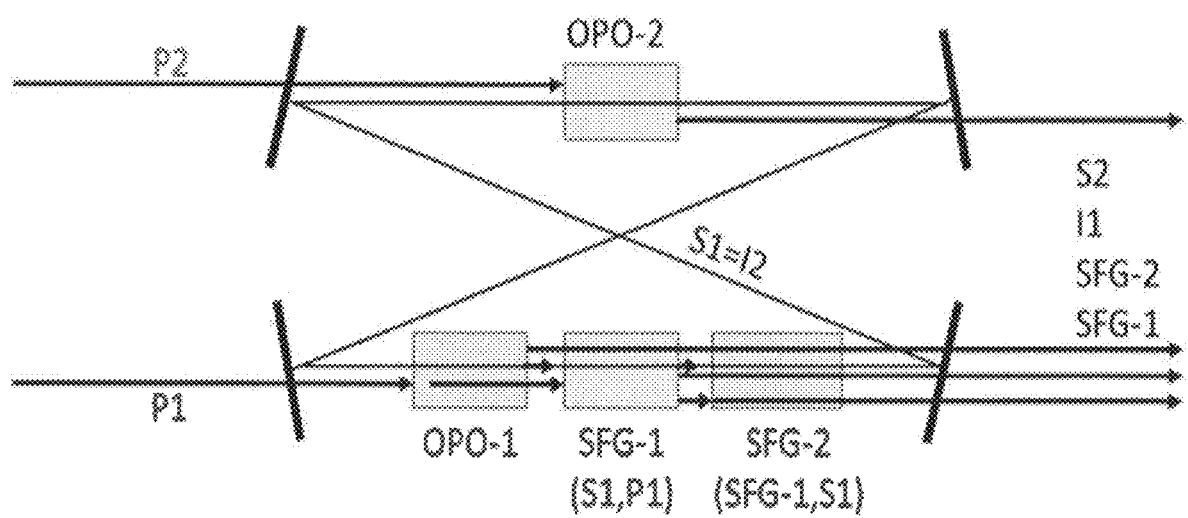
FIG. 5 is a schematic diagram of an OPO module pumped by a high power pump source and a second light source according to a fourth embodiment of the present invention.

FIG. 5 shows a very advanced embodiment of an OPO module which utilizes two OPO processes (OPO-1 and OPO-2). Both OPO crystals are pumped by respective high-power broadband pump sources P1 and P2. According to some embodiments, pump source P2 may be the SHG of pump source P1. Both OPO-1 and OPO-2 have a common resonator (such as a bow-tie ring-resonator). The resonant waves of OPO-1 (=S1) and OPO-2 (=I2) are substantially equal. A third NLO-process (SFG-1) utilizes the sum-frequency generation of P1 and S1. A fourth NLO-process (SFG-2) may utilize the sum-frequency generation of SFG-1 and S1. The following output emissions are expected to be broadband: I1, S2, SFG-1 and SFG-2.

Further means for reducing coherence length may arise from features of the pump source or the spectral filter (potentially enabling a longitudinal mode-scrambling of the pump-beam) or a dither on the resonant OPO-wave mode(s). Such means are described in U.S. Provisional Patent Application No. 62/561,428 entitled "Light Source With Multi-Longitudinal Mode Continuous Wave Output Based On Multi-Mode Resonant OPO Technology", filed on Sep. 21, 2017 (the disclosure of this application being hereby incorporated by reference). For example, additional scrambling means for scrambling the resonant wave(s) may be provided within the OPO module. Such scrambling may be achieved in some embodiments by fast variation of the resonator-length or fast dithering on wavelength selecting elements. Additional longitudinal mode scrambling may be taken into account as well (e.g., fast dither cavity length or effective Etalon-thickness or the effective ferroelectric grating period length. The latter two may be done mechanically or electro-optically). This would enable longitudinal mode-scrambling of the resonant OPO-wave.

Figure 6:
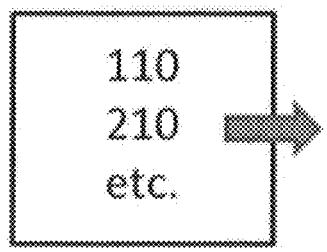
FIG. 6 is a more detailed schematic diagram of an example for pump source that may be used to pump the OPO module. The pump-source produces a multimode (a) or broadband output (b).
Figure 6:
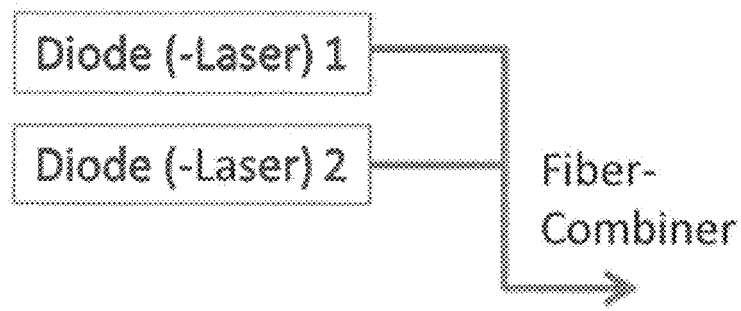
Figure 6:
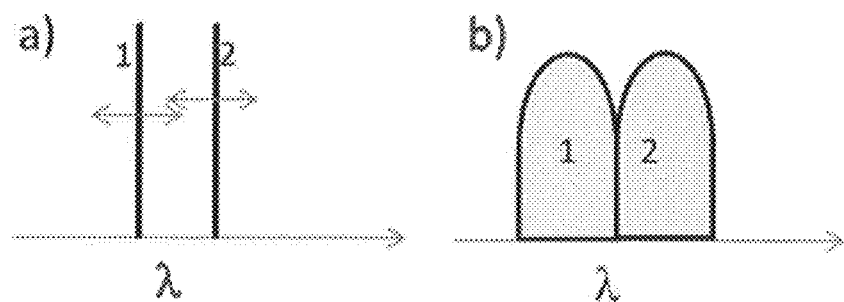

FIG. 6 shows one example of how the coherence of a pump-source may be reduced by combining the outputs of at least two sources (e.g., laser diode 1 and laser diode 2) forming one common pump source (e.g., pump source 110, 210, 320, etc.). FIG. 6a depicts how two slightly wavelength-separated modes may be added up. Additional fast wavelength modulations results in broadened output. In this scheme, for example, two potentially identical laser diodes may be used and swept anti-phase in current. The sweeping of the current results in a wavelength- and power-sweep. In this example, the center-wavelengths of the two laser diodes may be slightly different. When well-synchronized, it is possible to maintain the power of the combined output nearly constant while the combined output bandwidth is broadened by longitudinal-mode scrambling. FIG. 6b displays a simple case where two already broadband sources are combined. In this configuration, the center wavelengths of the two laser diodes are slightly different. As a result, the combined output is broadened.

Figure 7:
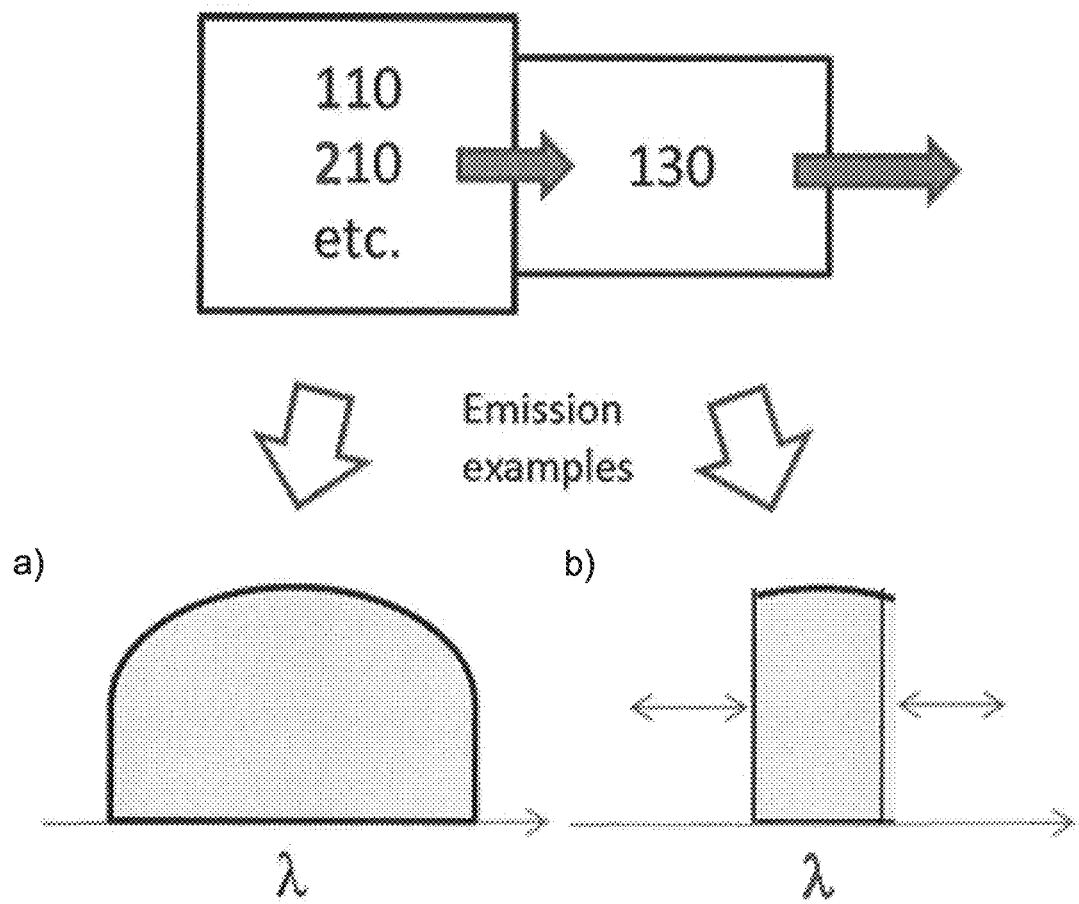
FIG. 7 is a more detailed schematic diagram for an exemplary broadband pump source followed by a tunable spectral filter.

FIG. 7 shows an example of how a tunable filter 130 may be used to manipulate the output-spectrum of an extremely broadband pump-source (for example, pump source 110, 210, etc., which may, for example, comprise a LED, a superluminescence diode, a supercontinuum or other extremely broadband source). As depicted in FIG. 7a, the emission output-spectrum of the extremely broadband pump-source (e.g., pump source 110, 210, etc.) without the tunable filter 130 may be much broader than that of the emission output-spectrum when the output from the extremely broadband pump-source (e.g., pump source 110, 210, etc.) passes through the tunable filter 130 as depicted by FIG. 7b. In this example, a tunable bandpass or a combination of tunable long-pass and short-pass may be used to provide the manipulated output-spectrum.

As such, the present invention provides a light source which is capable of generating tunable light of macroscopic power with a short coherence length. In particular, a broadband pump-source may be utilized to pump an OPO module such that the OPO-module generates an output having reduced coherence length at the wavelength of the non-resonant OPO wave (as compared to conventional OPO). In particular, a pump-source with a high-power level may be utilized to pump an OPO such that the OPO generates two new waves, generally referred to as the signal and idler, as noted in the background section. The OPO cavity is resonant for at least one of the two new waves, with at least parts of the output of the light-source widely adapting the bandwidth of the high power pump source (preferably providing a broadband output). The OPO module may be provided with NLO crystals having a broad pump acceptance bandwidth and a broadened gain-curve (for example, by a chirped ferroelectric poling, or with multi gain peaks by using multi poling crystal chips). Additional intracavity NLO processes (for example, SFG with the resonant wave or a second OPO-process) may optionally result in efficient generation of different wavelengths and macroscopic power levels (typically greater than 10 mW, possibly exceeding 1 W). The system may optionally use a second high power broadband source for mixing with the high power resonant wave. If desired, a variable spectral filter may be placed between the diode and the amplifier to enable bandwidth on demand.

According to the present invention, any generation involving the resonant OPO-wave is very efficient due to the high intracavity resonant wave power. Beneficially, the light source of the present invention is capable of efficiently producing radiation in the shorter NIR, VIS or even UV wavelength ranges. Such a light system is capable of generating light suitable for a variety of applications including microscopy and biotech.

In view of the foregoing, it is intended that the present invention cover modifications and variations of this invention provided they fall within the scope of the following claims and their equivalents.

What is claimed is:

1. A light source comprising:
at least one pump source comprising a low-power light source and an optical amplifier configured to produce a continuous wave broadband pump beam;
a wavelength and/or bandwidth spectral filter disposed to receive and filter an emission of the at least one pump source; and
an Optical Parametric Oscillator (OPO) module comprising an optical cavity containing a first crystal configured to receive light from the at least one pump source and produce via OPO process a first output light beam and a second output light beam, and a second crystal configured for SFG-process of the broadband pump beam and a resonant OPO wave,
wherein the at least one pump source and OPO module are configured to produce tunable broadband emission of macroscopic power that widely adapts the bandwidth of the at least one pump source, and the filter comprises a longitudinal mode scrambler.

2. The light source of claim 1, wherein the at least one pump source and OPO module are configured to produce tunable broadband emission of macroscopic power having a bandwidth larger than the at least one pump source.

3. The light source of claim 1, wherein the at least one pump source and OPO module are configured to produce tunable broadband emission of macroscopic power having a maximum emission bandwidth limited by a pump acceptance bandwidth of the first crystal and/or second crystal.

4. The light source of claim 1, wherein the at least one pump source and OPO module are configured to produce tunable broadband emission of macroscopic power having approximately the same bandwidth as the pump source.

5. The light source of claim 1, wherein an SFG emission has a bandwidth exceeding 300 GHz.

6. The light source of claim 5, wherein the OPO module further comprises a third crystal configured for SFG of the SFG emission and a resonant OPO wave to produce a tunable broadband emission of macroscopic power that widely adapts the bandwidth of the at least one pump source.

7. The light source of claim 1, wherein the at least one pump source comprises a first pump source and a second pump source, wherein only the second pump source is configured for pumping the second crystal.

8. The light source of claim 7, wherein the second pump source second-harmonic generator of the first pump source.

9. The light source of claim 7 further comprising a spectral filter disposed to receive and filter an emission of the first and/or second pump source.

10. The light source of claim 7, further comprising a longitudinal mode scrambler for the first and/or second pump source.

11. The light source of claim 1, where the low-power light source comprises a combination of at least two light sources wherein the two light sources are arranged to provide a broadened combined output emission, wherein the filter filters at least one of the two light sources.

12. The light source of claim 11, further comprising a fast wavelength modulation mechanism, wherein an output emission of at least one of the low-power pump sources is broadened by fast wavelength modulation.

13. A light source comprising:
a fast wavelength modulation mechanism;
at least one pump source configured to produce a broadband pump beam; and
an Optical Parametric Oscillator (OPO) module comprising ai optical cavity containing a first crystal configured to receive light from the at least one pump source and produce via OPO process a first output light beam and a second output light beam, and a second crystal configured for SFG-process of to broadband pump beam and a resonant OPO wave,
wherein the at least one pump source and OPO module are configured to produce tunable broadband emission of macroscopic power that widely adapts the bandwidth of the at least one pump source, at least one pump source comprises a combination of at least two pump sources, wherein the two pump sources are arranged to provide a broadened combined output emission, an output emission of at least one of the pump sources is broadened by fast wavelength modulation, and the at least one pump source comprises two synchronized laser diodes,
wherein output emissions of the two laser diodes are swept anti-phase in current to produce a combined output emission having substantially constant power and an output bandwidth broader than an output bandwidth of the individual laser diodes.

14. The light source of claim 11, wherein at least one of the two low-power pump source is a broadband pump source.

15. A method for generating broadband radiation greater than 300 GHz at a wavelength below 1.1 μm by using combined Optical Parametric Oscillator (OPO) and SFG technology pumped by at least one continuous wave pump source, the pump source comprising a low-power light source and an optical amplifier and a spectral filter tunable in wavelength and/or bandwidth disposed to receive an emission of the low-power light source, the method comprising the steps of:
delivering by the pump source the continuous wave broadband pump beam to an OPO module comprising an optical cavity containing a first crystal and a second crystal, wherein the first crystal receives light from the at least one pump source and produces via OPO process a first output light beam and a second output light beam, and wherein the second crystal performs SFG of the broadband pump beam and a resonant OPO wave;
thereby producing tunable broadband emission of macroscopic power that widely adapts the bandwidth of the at least one pump source,
wherein the filter comprises a longitudinal mode scrambler.

* * * * *